June 30, 1925.
E. H. M. KLUKAS
1,543,777
CULTIVATOR
Filed June 5, 1923
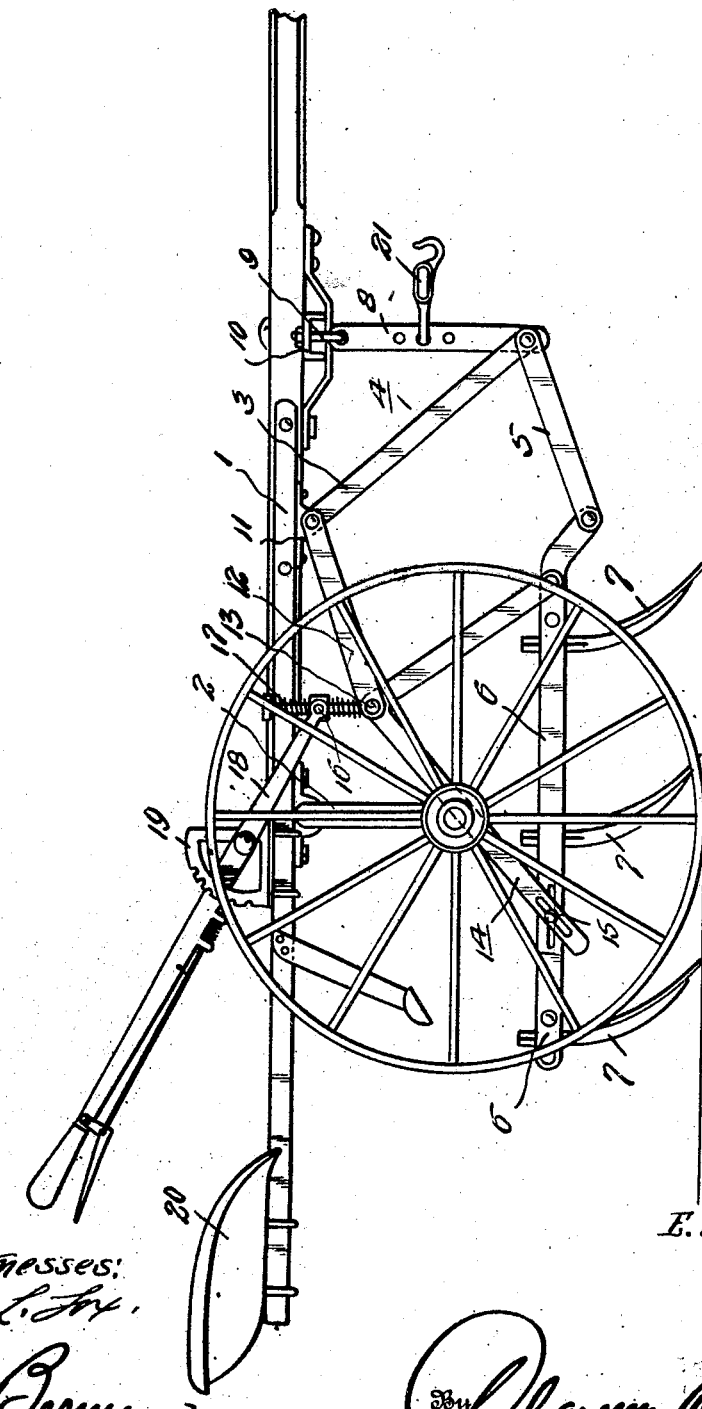
E. H. M. Klukas,
Inventor Patented June 30, 1925.

1,543,777

UNITED STATES PATENT OFFICE.

EDWARD H. M. KLUKAS, OF BALATON, MINNESOTA.

CULTIVATOR.

Application filed June 5, 1923. Serial No. 643,578.

*To all whom it may concern:*

Be it known that EDWARD H. M. KLUKAS, a citizen of the United States, residing at Balaton, in the county of Lyon and State of Minnesota, has invented certain new and useful Improvements in Cultivators, of which the following is a specification.

This invention has reference to cultivators and its object is to provide a corn cultivator in which all the shovels shall enter the ground to the same depth and at the same time. With this object in view the cultivator comprises a wheel supported frame having links pivotally connected with the forward portion of the frame and beams pivotally connected with the links for vertical swinging movement. An L-shaped support is pivotally connected at its forward end with the beam and having pin and slot connection at its rear end with the beam, the apex of the support being vertically disposed above the beam, a link is pivotally connected with the apex of the support with the frame and a lever is fulcrumed upon the frame and is provided with resilient means which is connected with the support at the apex thereof.

In the drawing:

The figure is a side elevational view of the cultivator.

As illustrated in the accompanying drawing, the cultivator structure includes a frame indicated in general at 1 and which in turn includes an arch axle 2 supported upon the ground engaging wheels.

A bar 10 is disposed transversely of the frame 1 and is provided with an eye 9 which is connected with a vertically disposed draft link 8. A draft clevis 21 is connected with the link 8 in a usual manner. An under frame 4 is carried by the frame 1 and includes bars 3 which are connected at their lower ends with the bar 8 and at their upper ends with the frame 1. Bearings 11 are provided at the under side of the frame 1 and the bar 3 is connected at its upper end with the said bearing. A link 12 is connected at one end with the bearing 11 for swinging movement and pivotally connected by means of a bolt 13 with an inverted L-shaped support 14. A link 5 is pivotally connected at its forward end with the lower end of the bar 8 and a cultivator beam 6 is pivotally connected at its forward end with the rear end of the link 5. The forward end of the support 14 is pivotally connected with the forward portion of the cultivator beam 6. The cultivator beam 6 carries the usual shovels 7. Pin and slot connection 15 is provided between the rear portion of the support 14 and the intermediate portion of the beam 6 and may be used for adjustably securing the support 14 with relation to the beam 6.

A lever 18 is fulcrumed upon the frame 1 and is arranged to swing along a detent segment 19 also mounted upon the frame 1. A pin 16 is interposed between the apex of the support 14 and the intermediate portion of the frame 1 and the spring sections 17 are interposed between the forward end of the lever 18 and the frame 1 and the apex of the support 14.

From the foregoing description taken in conjunction with the accompanying drawing it will be seen that the arrangement is such that when the lever 18 is swung the rear ends of the links 5 and 12 will be swung upon the pivots at their forward ends and the support 14 is raised or lowered carrying with it the beam 6 and consequently a simple and efficient means are provided for causing the shovels 7 to enter the ground to the same depth and at the same time.

What I claim is:

A cultivator comprising a wheel mounted frame, links pivotally connected with the forward portion of the frame, beams pivotally connected with the links for vertical swinging movement, an L-shaped support pivotally connected at its forward end with the beam and having pin and slot connection at its rear end with the beam, the apex of the support being vertically disposed above the beam, a link connecting the support at the apex thereof with the frame, a lever fulcrumed upon the frame, and resilient means connecting the working end of the lever with the support at the apex thereof.

In testimony whereof I affix my signature.

EDWARD H. M. KLUKAS.